(12) United States Patent
Smith et al.

(10) Patent No.: US 6,869,265 B2
(45) Date of Patent: Mar. 22, 2005

(54) LIFT DEVICE

(76) Inventors: Jack L. Smith, 117 County Rd. 1479, Cullman, AL (US) 35058; George Coleman Freeman, 101 County Rd. 86, Breman, AL (US) 35053; Jimmy Ray Rhodes, 628 Highland Dr., Altoona, AL (US) 35952

( * ) Notice: Subject to any disclaimer, the term of this patent is extended or adjusted under 35 U.S.C. 154(b) by 217 days.

(21) Appl. No.: 10/135,076

(22) Filed: May 1, 2002

(65) Prior Publication Data

US 2002/0168257 A1 Nov. 14, 2002

Related U.S. Application Data

(63) Continuation of application No. 09/706,890, filed on Nov. 6, 2000, now abandoned.

(51) Int. Cl.[7] .................................................. B60P 1/44
(52) U.S. Cl. ...................................... 414/462; 414/546
(58) Field of Search ............................... 224/401, 412, 224/413, 447, 488, 921; 414/462, 465, 466, 546

(56) References Cited

U.S. PATENT DOCUMENTS

| | | | | | |
|---|---|---|---|---|---|
| 6,461,095 | B1 | * | 10/2002 | Puska | 414/462 |
| 6,638,001 | B1 | * | 10/2003 | McKinley | 414/462 |
| 2001/0046431 | A1 | * | 11/2001 | McElhany | 414/462 |

* cited by examiner

Primary Examiner—Janice L. Krizek

(57) ABSTRACT

A lift device for loading game animals or other objects, onto the cargo rack of an ATV. The lift device includes a vertical support frame member adapted for attachment to the rear of an ATV. A horizontally extending base support member is pivotally attached at one end thereof to the bottom of the vertical support frame member; a loading platform is pivotally hinged to the opposite end of the horizontally extending base support member. A cable is attached to the base support member and a winch, mounted on the vertical support frame member, moves the cable to move the lift device from a loading position on the ground to a loaded position wherein the game animal is secured by the loading platform on the top of the ATV cargo rack.

5 Claims, 2 Drawing Sheets

LIFT DEVICE

CROSS-REFERENCE TO RELATED APPLICATION

This application is based on application Ser. No. 09/706,890; filed Nov. 6, 2000, now abandoned. Applicants request to retain the benefit of this earlier-filed application.

BACKGROUND OF THE INVENTION

1. Field of the Invention

The present invention relates to a lift device particularly used to lift game animals and the like objects. The lift device is adapted for mounting on the rear of an All-Terrain-Vehicle (ATV), which is often used to transport game animals. The lift device also functions as a carrier for game animals in transporting same from hunting grounds. The lift device is designed for quickly and easily mounting onto the ATV frame.

2. Description of the Prior Art

MUZZI et al (U.S. Pat. No. 5,662,451) discloses a hoist for lifting game animals. The Muzzi et al device is adapted for mounting on the cargo rack of an ATV. However, the device requires a horizontal hoist boom with multiple pulleys. The device is also permanently secured to the ATV and is not easily assembled and disassembled, as in applicants' device. The device of Muzzi et al is not adapted for folding down onto the ATV rack, thereby securing the game on the cargo rack for transporting the game, as does Applicants' device.

Caldwell (U.S. Pat. No. 5,911,556) discloses an all-terrain-vehicle deer caddy. This device requires a lift leg that must insert in the ground for lifting the game; and, the ATV must be operating in a forward gear at the time of lifting. Applicants' invention does not require any lift leg assistance from the ground, nor does the ATV have to move while lifting. Also, the lift of Caldwell is not capable of "lock-down" and "out-of-the-way" position as with applicants' lift device during transport.

None of the inventions of the above-cited patents taken either singly or in combination is seen to describe the instant invention as claimed.

SUMMARY OF THE INVENTION

The present invention is directed to a lift device for loading game animals and for securing the animals on the cargo rack of an ATV for transport. The lift device includes a vertical support frame adapted for attachment to the rear of an ATV by bolts, clamps or other suitable means; a horizontally extending support frame pivotally attached to the base of the vertical support frame; and, a loading platform pivotally secured to the rear of the horizontal support frame for carrying game. The invention further includes a pulley mounted on the vertical support frame, a cable attached to the horizontal support frame and extending over the pulley, and a winch for operating said cable in raising and lowering the lift device as desired. The invention further includes an electric motor as a preferred means of operating the winch.

Accordingly, it is the principal object of the present invention to provide a lift device for loading game animals in the field.

It is a further object of the invention to provide a lift device for loading game animals onto the rear cargo rack of an ATV in the field, and for transporting the animals safely and securely from the field.

It is a further object of the present invention to provide a lift device with a support platform on which game animals or other cargo may be carried.

Another object of this invention is to provide a compact lift device which is carried to the field and from the field in an out-of-the-way manner securely on top of the ATV cargo rack.

A still further object of this invention is to provide a self-contained lift device which can be operated by the touch of a button, without the assistance of the vehicle or the ground.

A yet further object of this invention is to provide a loading platform having pairs of cradle arms at each end thereof for assisting in the support of the animals or other cargo being loaded and transported.

These and other objects of the present invention will become readily apparent upon further review of the following specifications and drawings.

DETAILED DESCRIPTION OF THE PREFERRED EMBODIMENTS

Figure 1:
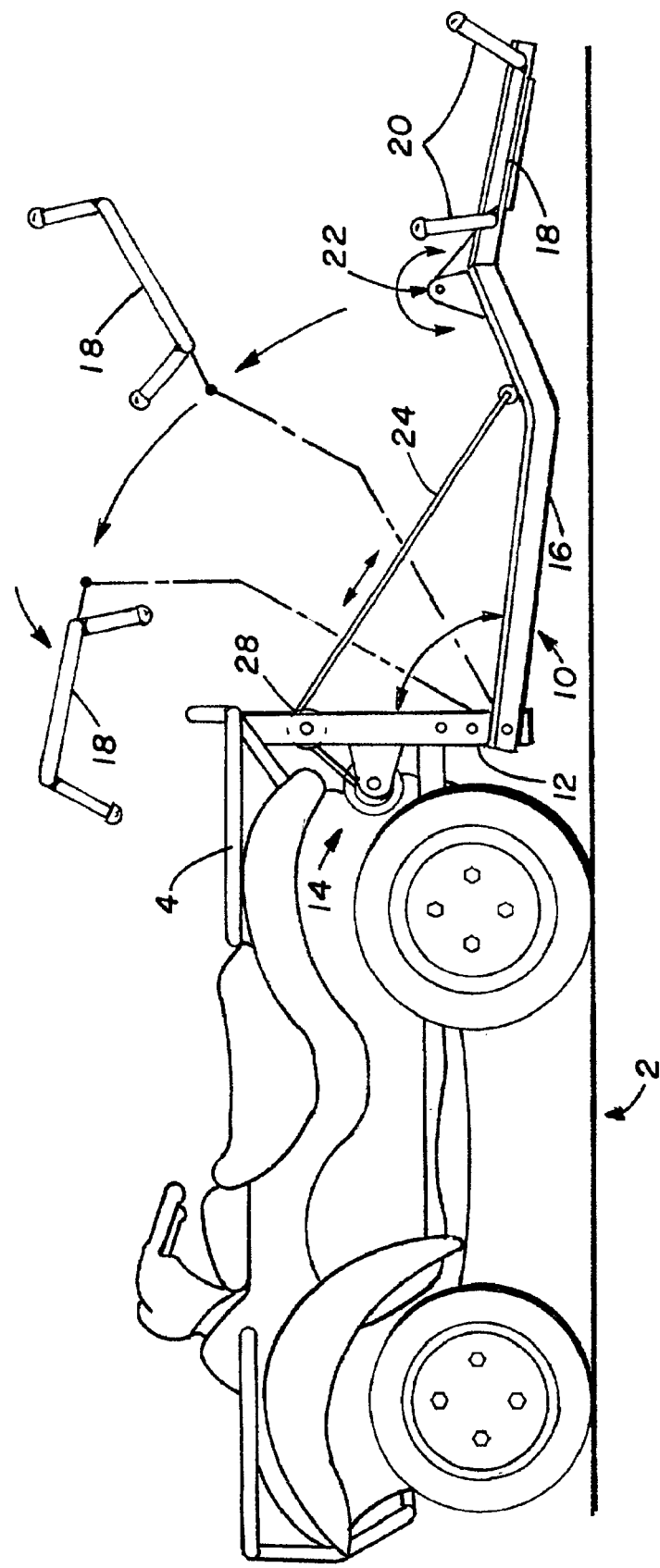
FIG. 1 is a side elevation view depicting the lift device attached to the ATV and in the lowered (loading) position near the ground; and, also shows partial shadow outlines of multiple loading positions.
Figure 2:
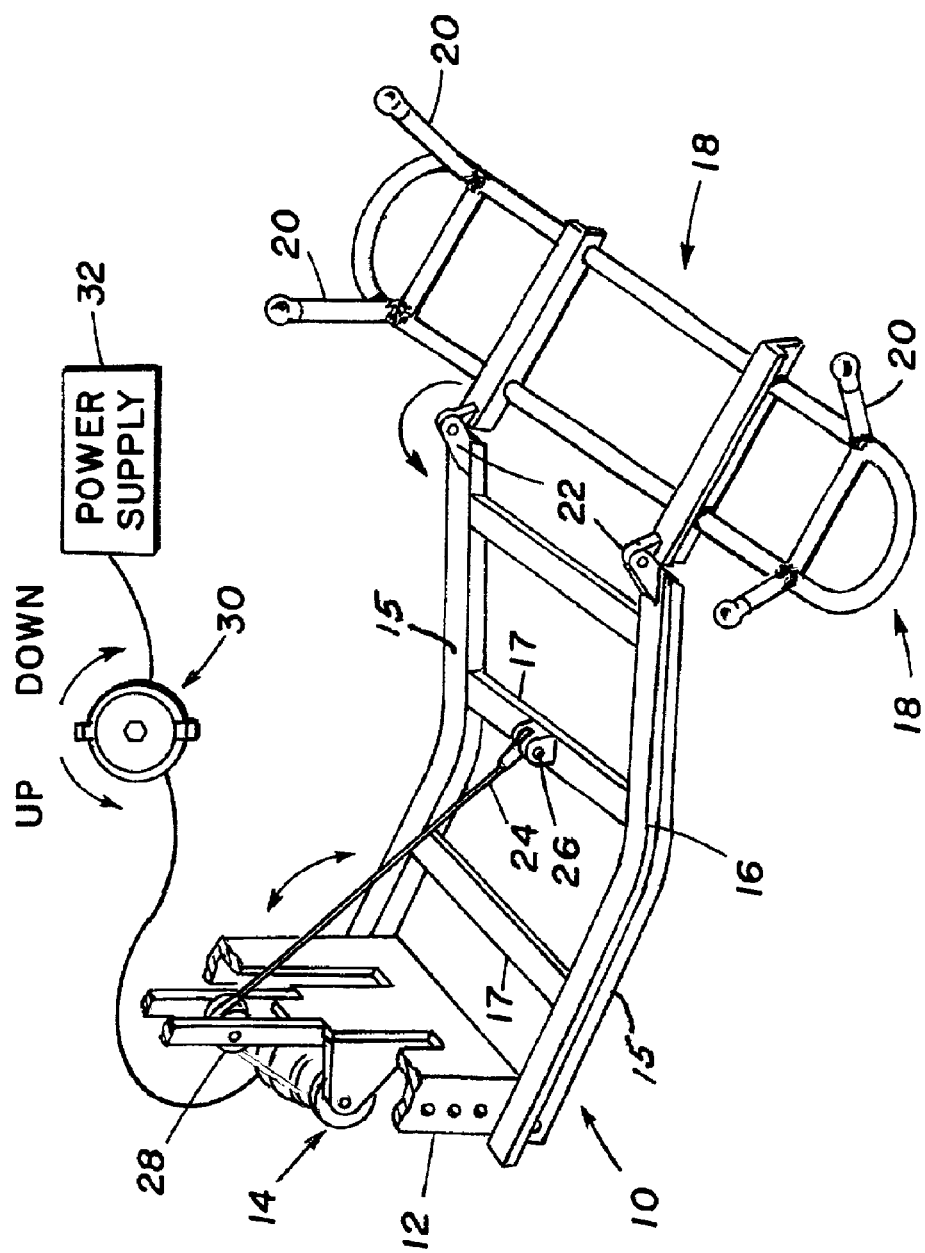
FIG. 2 is a perspective top view of the entire lift device unattached from the ATV.

Referring to FIGS. 1 & 2, the present invention is directed to a lift device 10 for lifting game animals or other objects and securing the same on the cargo rack of an ATV 2.

The lift device 10 includes a vertical support frame member 12 which is attached to the rear of the ATV as shown in FIG. 1. An electric winch 14 is mounted within frame member 12. A pulley 28 is mounted near the upper end of vertical support member 12. Lift device 10 further includes a horizontally and rearward extending base support member 16 which is a substantially rectangular framework having two parallel side lift arms 15 and multiple cross braces 17. Hinge means 22 is provided at the rearward end of base support member 16. A loading platform 18 is pivotally mounted by hinge means 22 on the rearward end of the base support member 16. A pair of cradle arms 20 is provided at each end of the platform 18 for cradling the load to be carried and also assist in securing the load on the ATV cargo rack 4. Cable means 24 is pivotally secured at 26 on cross brace 17, and extends over pulley 28 from winch 14 as shown in FIGS. 1 & 2. Control means 30 is electrically connected between the winch 28 and the power supply 32 for moving the lift device up or down from a loading position on the ground to a loaded position, wherein the loading platform 18 flips over and down contiguous the cargo rack holding the load thereon.

In use, the lift, in its traveling state, is substantially in the top position shown in FIG. 1, but with the platform directly over and contiguous with the top of the ATV cargo rack. To load a game animal, the lift device is lowered by the cable/winch to the ground, such as shown in FIG. 1. The animal can then be pulled onto and totally within the platform from one end thereof. The animal, or other load, is then lifted, as depicted in FIG. 1 to the loaded position wherein the animal is laying on the ATV cargo rack with the platform on top of the animal thereby securing the same while traveling. No other means is needed to transport the animal safely and securely.

In operation, as the cable causes the base support member to rotate alternately from a generally horizontal position to a generally vertical position contiguous with the vertical support member whereby, as the base support member approaches its generally vertical position beyond the vertical, at which point said loading platform will be flipped into an inverted and generally horizontal position, and is thus brought forcibly into contact with the cargo rack of said vehicle as the pivoted base support member continues its rotation to its generally vertical position thereby forcibly retaining the game animal, such as deer or like objects, onto the cargo rack of the ATV or similar vehicle.

It is to be understood that the present invention is not limited to the embodiment described above, but encompasses any and all embodiments within the scope of the following claims.

We claim:

1. A lift device adapted for attachment to the rear of an ATV, or similar vehicle, for loading and forcibly retaining large game animals, such as deer or like objects, onto the cargo rack of such a vehicle, said lift device comprising;

a vertical support member having means for attachment to said vehicle;

a base support member pivoted at one end thereof to the bottom end of said vehicle support member and having a hinge joint means on its opposite end;

a loading platform pivotally mounted by said hinge joint means to said base support member;

cable means connected to said base support member between said vertical frame and said hinge joint means; and, means mounted on said vehicle support member for moving said cable so as to rotate said base support member alternately from a generally horizontal position to a generally vertical position contiguous with the vertical support member whereby, as said base support member approaches its generally vertical position, said pivotally mounted loading platform will be rotated from a generally horizontal position to a position beyond the vertical position at which point said loading platform will be flipped into an inverted and generally horizontal position and is thus brought forcibly into contact with the cargo rack of said vehicle as the pivoted base support member continues its rotation to its generally vertical position thereby forcibly retaining large game animals, such as deer or like objects, onto the cargo rack of said ATV or similar vehicle.

2. The lift device of claim 1, wherein the loading platform securely rests on top of the game when loaded on the ATV cargo rack.

3. The lift device of claim 1, wherein the means for moving the cable is a winch.

4. The lift device of claim 3, wherein the winch is driven by an electric motor.

5. The lift device according to claim 1, wherein the loading platform has formed integral therewith pairs of cradle arms at each end thereof.

\* \* \* \* \*